United States Patent

Takeda et al.

[11] Patent Number: 5,751,684
[45] Date of Patent: May 12, 1998

[54] RECORDING/REPRODUCING APPARATUS AND METHOD FOR RECORDING/REPRODUCING INFORMATION USING PROBE

[75] Inventors: Toshihiko Takeda, Atsugi; Ryo Kuroda, Kawasaki; Susumu Yasuda, Machida, all of Japan

[73] Assignee: Canon Kabushiki Kaisha, Tokyo, Japan

[21] Appl. No.: 676,684

[22] Filed: Jul. 10, 1996

[30] Foreign Application Priority Data

Jul. 10, 1995 [JP] Japan ................... 7-198226
Feb. 15, 1996 [JP] Japan ................... 8-052363

[51] Int. Cl.[6] ........................................... G11B 7/00
[52] U.S. Cl. .................................. 369/126; 250/306
[58] Field of Search ......................... 369/126, 54, 58, 369/47, 48, 59, 124; 250/306, 307

[56] References Cited

U.S. PATENT DOCUMENTS

| | | | |
|---|---|---|---|
| 4,343,993 | 8/1982 | Binnig et al. | 250/306 |
| 4,680,456 | 7/1987 | Drexler | 235/454 |
| 4,701,880 | 10/1987 | Ichihara | 365/106 |
| 4,724,318 | 2/1988 | Bennig | 250/306 |
| 4,904,895 | 2/1990 | Tsukamoto et al. | 313/336 |
| 4,956,578 | 9/1990 | Shimizu et al. | 315/3 |
| 5,023,110 | 6/1991 | Nomura et al. | 427/49 |
| 5,132,533 | 7/1992 | Kawase et al. | 250/306 |
| 5,155,416 | 10/1992 | Suzuki et al. | 315/366 |
| 5,239,576 | 8/1993 | Yoshida et al. | 379/355 |
| 5,260,567 | 11/1993 | Kuroda et al. | 250/227 |
| 5,285,129 | 2/1994 | Takeda et al. | 313/346 |
| 5,348,735 | 9/1994 | Kawase et al | 29/407 |
| 5,391,871 | 2/1995 | Matsuda et al. | 250/306 |
| 5,404,349 | 4/1995 | Nose et al. | 369/126 |
| 5,470,265 | 11/1995 | Nomura et al. | 445/24 |
| 5,519,686 | 5/1996 | Yanagisawa et al. | 369/126 |
| 5,576,051 | 11/1996 | Takeda et al. | 427/77 |
| 5,605,483 | 2/1997 | Takeda et al. | 445/2 |

FOREIGN PATENT DOCUMENTS

| | | |
|---|---|---|
| 0 614 177 A2 | 9/1994 | European Pat. Off. |
| 63-161552 | 7/1988 | Japan . |
| 63-161553 | 7/1988 | Japan . |
| 1-133239 | 5/1989 | Japan . |
| 5-314550 | 11/1993 | Japan . |
| WO 89/00742 | 1/1989 | WIPO . |

*Primary Examiner*—Muhammad N. Edun
*Attorney, Agent, or Firm*—Fitzpatrick, Cella, Harper & Scinto

[57] ABSTRACT

In recording/reproduction of information, a probe is used to scan the surface of a recording medium in which a recording bit is formed and the recording bit is detected by comparing a signal detected via the probe with a predetermined threshold value. A signal detected within the recording surface is normalized on the basis an amplitude value of a signal detected on a portion where no recording bit is present by the probe.

12 Claims, 6 Drawing Sheets

RECORDING/REPRODUCING APPARATUS AND METHOD FOR RECORDING/REPRODUCING INFORMATION USING PROBE

BACKGROUND OF THE INVENTION

1. Field of the Invention

The present invention relates to a recording/reproducing apparatus and method for recording and reproducing information using the principle of a scanning probe microscope.

2. Related Background Art

In recent years, a scanning tunnel microscope (to be abbreviated as an STM hereinafter) that allows observation of conductive material surfaces at a resolution on the order of nanometers or less, as described in U.S. Pat. No. 4,343,993, has been developed, and the atomic arrangements, orientations of organic molecules, and the like on metal or semiconductor surfaces can be observed on the atomic or molecular scale.

Also, an atomic force microscope (to be abbreviated as an AFM hereinafter) that develops the STM technique and allows observation of the surfaces of insulating substances at a resolution equivalent to that of the STM has been developed (U.S. Pat. No. 4,724,318).

Upon application of the principle of a scanning probe microscope (to be abbreviated as an SPM hereinafter) such as an STM, AFM, or the like, a proposal for realizing a high-density memory by performing recording/reproduction upon accessing a recording medium using a probe on the atomic or molecular scale has been made (Japanese Laid-Open Patent Application Nos. 63-161552 and 63-161553).

A recording/reproducing apparatus may adopt a method of detecting bits by means of threshold value processing for comparing the magnitude of a physical interaction (to be simply referred to as an interaction hereinafter) between the probe tip, which is brought close to a recording surface, and the recording surface with a pre-set threshold value.

For example, when a bit portion and a portion other than the bit portion have a conductivity difference therebetween, a bit is reproduced by comparing the value of a very small current (e.g., a tunnel current) that flows in a probe having conductivity with a threshold value upon scanning the probe above the recording surface while applying a voltage across the probe and a recording medium.

However, in such recording/reproducing apparatus, a bit and a portion other than the bit may be erroneously recognized as follows.

More specifically, the magnitude of the interaction between the probe tip and the recording surface largely changes due to a slight change in interval therebetween.

Therefore, when the interval between the probe tip and the recording surface changes depending on the use environments (temperature, humidity, and the like) of the recording/reproducing apparatus, the threshold value processing cannot normally function depending on the change amount, and a portion other than a bit may be erroneously recognized as a bit.

A state that causes such recognition error of bits will be described below with reference to FIGS. 1A to 1F.

Assume that a probe is scanned along a straight line connecting the centers of two bits (to be referred to as bit sequence 1) to perform bit detection in a certain environment (called environment 1).

Figure 1A:
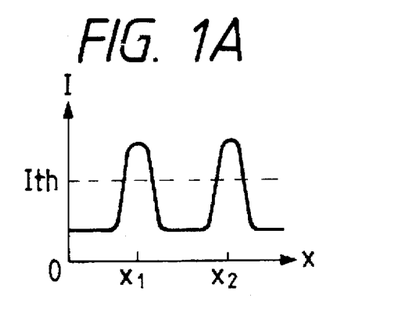
FIGS. 1A to 1F are graphs showing examples of threshold value processing upon bit reproduction.

In this case, assume that the distribution of the magnitude (I) of the interaction between the probe tip and the recording surface detected by the probe is as shown in FIG. 1A.

Note that x1 and x2 represent the x-coordinate values of the central positions of the bits on the recording surface.

Figure 1B:
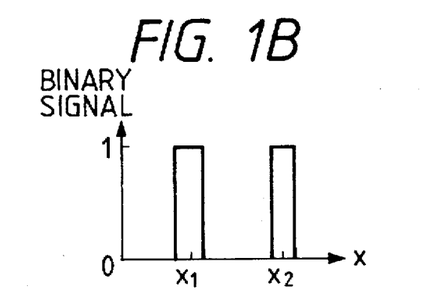

If the magnitude of a threshold value is set to be Ith (broken line portion) in FIG. 1A so as to perform binarization processing of the magnitude I of the interaction, only two bits can be recognized, and no bit recognition error has occurred (see FIG. 1B).

However, assume that bit sequence 1 is reproduced in an environment in which the interval between the probe tip and the recording surface becomes smaller than that in environment 1 above.

In this case, the magnitude of the interaction between the probe tip and the recording surface becomes larger than that in environment 1 as a whole.

Figure 1C:
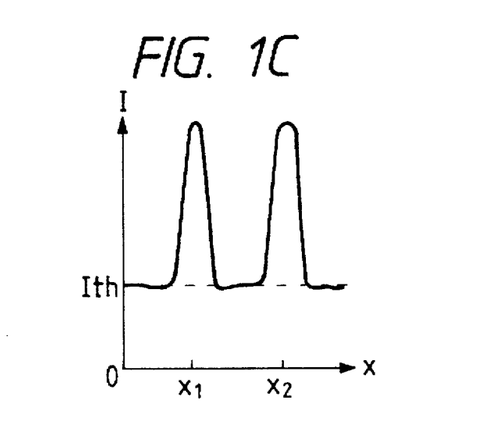

In an extreme case, the magnitude of the interaction may become close to the threshold value Ith even in a region other than a bit region (see FIG. 1C).

Figure 1D:
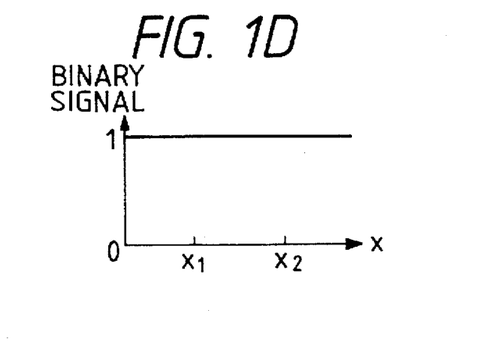

When the binarization processing is executed in this state, a region other than the bit region may be erroneously recognized as a bit (see FIG. 1D).

On the other hand, assume that bit sequence 1 is reproduced in an environment in which the interval between the probe tip and the recording surface becomes larger than that in environment 1. In this case, the magnitude of the interaction between the probe tip and the recording surface becomes smaller than that in environment 1 as a whole.

Figure 1E:
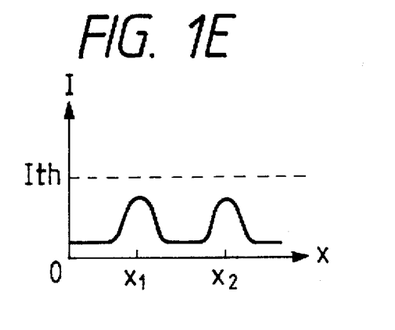

In an extreme case, the magnitude of the interaction may become smaller than the threshold value Ith even on a bit portion (see FIG. 1E).

Figure 1F:
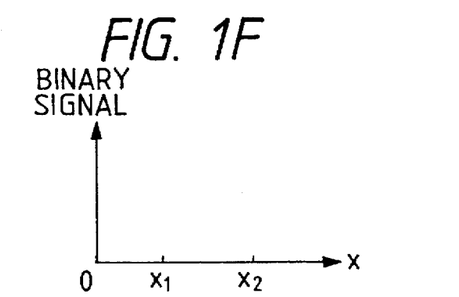

When the binarization processing is executed in this state, a bit cannot often be recognized (see FIG. 1F).

The interval between the recording surface and the probe tip changes not only in the above-mentioned cases. For example, a substance (e.g., the recording medium itself) may become attached to the probe tip, and consequently, the distance between the recording surface and the probe tip changes.

Such bit recognition errors can be avoided in principle by controlling the threshold value to change it in correspondence with the interval between the probe tip and the recording surface in each bit reproduction or by controlling the interval to maintain it at a desired value.

However, a recording/reproducing apparatus often uses a plurality of probes to realize high-speed reproduction and parallel reproduction.

When a plurality of probes are used, the intervals between the probe tips and the recording surface cannot normally become equal to each other.

In such a case, in order to realize accurate bit recognition, threshold value control or interval control may be performed by a single control computer for each of the probes. However, in this case, the control is complicated, and much time is required.

As a result, the total reproduction time is prolonged. On the other hand, when the interval control is executed, the consumption power of the apparatus inevitably increases.

When the number of control computers is increased, the volume of the apparatus increases, and at the same time, the consumption power also increases.

SUMMARY OF THE INVENTION

It is, therefore, an object of the present invention to provide a recording/reproducing apparatus and method which can solve the conventional problems described above, comprising a signal processing means and step that can realize accurate bit recognition without executing complex threshold value control or interval control for each probe and without changing a threshold value in binarization processing even when the interval between the probe tip and the recording surface varies in units of probes or even when the interval changes depending on a change in use environment of the apparatus.

In order to achieve the above object, there is provided a recording/reproducing apparatus in which scanning is effected using a probe above a recording surface of a recording medium on which a recording bit is formed, and the recording bit is detected by comparing a signal detected via the probe with a predetermined threshold value, and the apparatus is provided with signal processing means for normalizing a signal detected within the recording surface, on the basis of an amplitude value of a signal detected by the probe at positions where the recording bit is not present.

In order to achieve the above object, in a recording/ reproducing method in which scanning is effected using a probe above a recording surface of a recording medium on which a recording bit is formed, and the recording bit is detected by comparing a signal detected via the probe with a predetermined threshold value, the method includes the steps of; detecting a signal using the probe at a position where the recording bit is not present, normalizing a signal detected within the recording surface on the basis of an amplitude value of the detected signal, and detecting the recording bit by comparing the normalized signal with the threshold value.

The above and other objects of the present invention will become apparent from the following description of the embodiments.

DETAILED DESCRIPTION OF THE PREFERRED EMBODIMENTS

The principle of signal processing of the present invention will be described below with reference to the accompanying drawings.

A recording/reproducing apparatus according to the present invention has a plurality of probes, which can be identified and designated by No. p (p=1, 2, . . . , the maximum number of probes arranged in the recording/ reproducing apparatus).

Each probe is fixed to the free end of a cantilever, and a plurality of cantilevers are fixed to a single cantilever supporting member.

The signal processing of the present invention will be described below while taking as an example a case wherein the signal strength of a signal that reflects the state of the recording surface detected by a probe upon bit reproduction on a bit portion is relatively larger than that detected on a recording surface portion other than the bit portion.

During the period from bit reproduction start time t=1 to time t=m (m>1), the probe tip faces a recording surface portion other than the bit portion, and a new signal is formed by setting the ratio (given by formula (1) below) between a maximum signal strength Ip(max) of those that reflect the state of the recording surface detected by probe No. p during the period from time t=1 to time t=m, and a signal strength Ip(n) that reflects the state of the recording surface detected by probe No. p at arbitrary time t=n (n≦m) during bit reproduction to be a new signal strength at time t=n, i.e., by normalizing Ip(n) by Ip(max):

$$Ip(n)/Ip(\text{max})=Jp(n) \tag{1}$$

Then, the new signal is subjected to binarization processing using a predetermined threshold value (e.g., 1), thereby detecting a bit recorded on the recording surface.

In the present invention, this signal processing is performed not only for probe No. p which is detecting signals that reflect the state of the recording surface but also for the probes of all other numbers.

An example of the signal processing according to the present invention will be described below with reference to FIGS. 2A to 2C.

Assume that a reproduction operation is performed by scanning a probe above the recording surface while holding a constant interval h between the cantilever supporting member and the recording surface in a certain use environment (to be referred to as environment 1 hereinafter) of the apparatus.

Figure 2A:
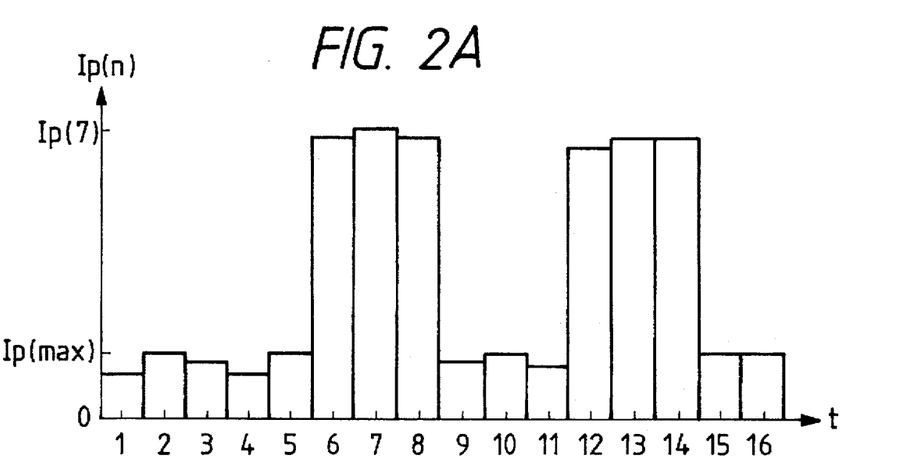
FIGS. 2A to 2C are graphs showing the signal processing steps according to the present invention.

FIG. 2A is a graph showing the time-series pattern of signal strengths that reflect the state of the recording surface detected by a probe when the probe of a given number (assumed to be No. p hereinafter) scans portions above two bits and neighboring portions.

The abscissa (t) in FIG. 2A plots the time elapsed from the beginning of the bit reproduction operation of the probe.

Assume that t=1 corresponds to the bit reproduction start time, and the probe is located on a recording surface portion other than a bit portion during the period from time t=1 to time t=5.

The ordinate (Ip(n)) plots the signal strengths detected by the probe at the respective timings, and Ip(n) (t=1, 2, 3, . . . , n) represents the signal strength that reflects the state of the recording surface detected by the probe at time t=n.

For example, Ip(1) is the signal strength detected by the probe at n=1. The magnitude of Ip(n) is uniquely determined when the interval, s, between the probe tip and the recording surface and the state, ϕ, of the recording medium that the probe tip faces are determined.

The state ϕ of the recording medium is the energy barrier of the recording medium that the probe tip faces if the signal to be detected by the probe is a tunnel current that flows between the recording medium and the probe.

Note that the probe scans portions above the bits only when 6≦t≦8 and 12≦t≦14 in FIG. 2A.

The signal processing result of the present invention for the signals shown in FIG. 2A will be described below. The signal strength Ip(max) necessary for the signal processing is determined from a maximum signal strength Ip(max) of those that reflect the state of the recording surface detected by probe No. p during the period from time t=1 to time t=4.

In the case of FIG. 2A, Ip(max) is:

$$Ip(\text{max})=Ip(2) \tag{2}$$

When the probe scans a region other than the bit portion, the magnitude of Ip(n) does not become constant but fluctuates.

However, Ip(n) never exceeds a certain maximum value (smaller than the signal strength on the bit portion).

The maximum value substantially equals Ip(max) unless the state of the recording signal before formation of bits has an extremely large difference.

The signal processing is performed according to formula (1) above using Ip(max).

The processing result will be described below upon classification into some cases.

<Case 1> When the probe scans a region other than the bit portion after Ip(max) is determined In this case (t=5, 9≤t≤11, 15≤t≤16), $$Ip(n) \leq Ip(\text{max}) \quad (3)$$

Therefore, $$Jp(n) = Ip(n)/Ip(\text{max}) \leq 1 \quad (4)$$

<Case 2> When the probe scans the bit portion after Ip(max) is determined

In this case (6≤t≤8, 12≤t≤14), $$Ip(n) > Ip(\text{max}) \quad (5)$$

Therefore, $$Jp(n) = Ip(n)/Ip(\text{max}) > 1 \quad (6)$$

Figure 2B:
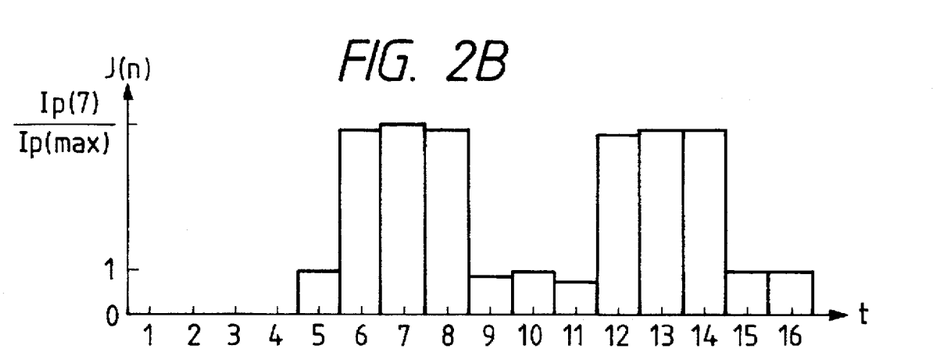

FIG. 2B shows an example of Jp(n)=Ip(n)/Ip(max) based on formulas (4) and (6).

Binarization processing is performed for a new signal strength Jp(n) at time t=n, as shown in FIG. 2B while setting the threshold value=1.

Figure 2C:
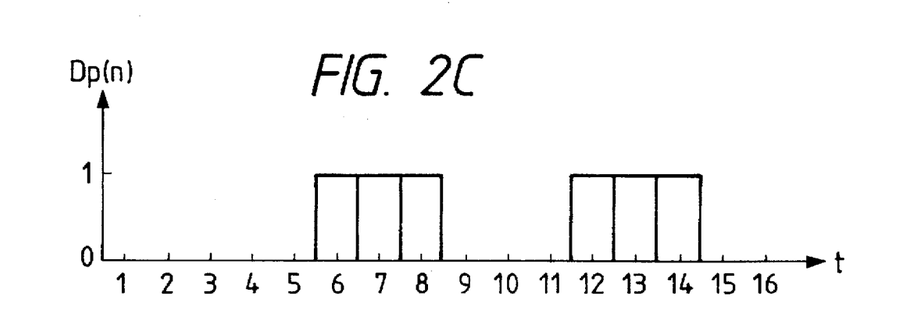

As a result, a digital signal Dp(n) shown in FIG. 2C is obtained, and only bits are accurately detected.

The above-mentioned signal processing is independently performed for all the probes which detect signals that reflect the state of the recording surface in environment 1.

More specifically, the above-mentioned signal processing is also performed for signals Iq(n) detected by a probe of an arbitrary number q (≠p).

In environment 1, the interval between the tip of probe No. q and the recording surface during bit reproduction is normally different from that of probe No. p.

However, paying attention to probe No. q:

<Case 1> When the probe scans a region other than the bit portion after Iq(max) is determined:

In this case, $$Iq(n) \leq Iq(\text{max}) \quad (7)$$

Therefore, $$Jq(n) = Iq(n)/Iq(\text{max}) \leq 1 \quad (8)$$

<Case 2> When the probe scans the bit portion after Iq(max) is determined

In this case, $$Iq(n) > Iq(\text{max}) \quad (9)$$

Therefore, $$Jq(n) = Iq(n)/Iq(\text{max}) > 1 \quad (10)$$

More specifically, even when bit reproduction is performed by simultaneously using a plurality of probes having different intervals between the probe tips and the recording surface, the signal processing according to the present invention allows to accurately detect only bits without executing interval control between the probes and the recording surface and threshold value control for each probe. In other words, the signal processing according to the present invention does not depend on the interval between the probe tip and the recording surface.

Assume that the same probe and apparatus as those used in reproduction in environment 1 are used in an environment different from environment 1 (to be referred to as environment 2 hereinafter), and the probe is scanned above the bits and their neighboring portions while holding the same interval between the probe and the recording surface as that in environment 1.

Also, assume that the intervals between the probe tips and the recording surface in environment 2 are different from those in environment 1.

In environment 2 as well, when the signal processing according to the present invention is performed, bit detection can be realized while setting the threshold value to be 1. This is because the signal processing according to the present invention does not depend on the interval between the probe tip and the recording surface, as described above.

In the above examples, binarization processing is performed while setting the threshold value to be 1. However, depending on the state of a recording signal, it is often preferable to set the threshold value to be a value larger than 1. For example, when spike-pulse noise is sometimes mixed in a signal detected on the recording surface portion in the vicinity of the bit portion, if the threshold value is set to be 1, such noise may be erroneously recognized as a bit.

In this case, the threshold value can be set to be an appropriate value such as 3, 10, 30, 100, and the like.

As the threshold value becomes larger, the probability of occurrence of a bit recognition error becomes lower, i.e., a non-bit portion is recognized as a bit with lower probability.

However, conversely, a bit portion is determined as a non-bit portion with higher probability. In consideration of such facts, the threshold value can be determined.

The signal to be subjected to the threshold value processing is not limited to that given by formula (1) above. For example, a signal obtained by further processing the signal given by formula (1) may be subjected to the threshold value processing. For example, when a slight change in interval between the probe tip and the recording surface corresponds to a change in the order of magnitude of I(n) (e.g., a tunnel current), bit detection may be performed by setting a threshold value with respect to the logarithm (lnJ(n)) of J(n). In this case as well, even when probes in the recording/reproducing apparatus have different intervals between the probe tips and the recording surface, or even when the interval changes due to a change in use environment of the apparatus:

<Case 1> When the probe scans a region other than the bit portion:

In this case, from formula (4), $$lnJp(n) = ln(Ip(n)/Ip(\text{max})) \leq 0 \quad (11)$$

<Case 2> When the probe scans the bit portion:

In this case, from formula (6), $$lnJp(n) = ln(Ip(n)/Ip(\text{max})) > 0 \quad (12)$$

Therefore, when the threshold value processing is performed for lnJ(n), only a bit portion can be detected by setting the threshold value to be 0. Note that formulas (11)

and (12) hold even when the interval between the probe and the recording surface changes every time bit reproduction is performed.

When the signal processing according to the present invention is performed, as described above, even when the signal strength detected by the probe entirely changes upon every bit reproduction, the signal strength of a portion other than the bit portion can be apparently set to be 1 (or 0) in a signal immediately before the binarization processing. Therefore, even when the signal strength detected by the probe changes upon every bit reproduction, the same binarization processing result can be obtained by setting the threshold value to be 1 (or 0). As a result, bit recognition errors can be avoided.

In the above description, Ip(max) is determined based on signals detected by the probe during the period from t=1 to t=4. However, the present invention is not limited to this.

For example, Ip(max) may be determined based on more data if many strengths Ip(n) are detected during the period from t=1 until the probe encounters the first bit.

As the first example of this determination method, a method of determining Ip(max) on the basis of the average value of signal strengths detected on the recording surface portion other than the bit portion may be used.

In this method, for example, the average value, given by the following formula, of detected signal strengths during the period from bit reproduction start time t=1 to time t=m (m>1) is used as Ip(max):

$$\sum_{k=1}^{m} Ip(k)/m$$

With this processing, even when a large noise component unexpectedly mixes in signals detected during the period from t=1 to t=m, the influence on Ip(max) can be reduced.

As the second example of the Ip(max) determination method, a method of determining Ip(max) based on the median value of signal strengths detected on the recording surface portion other than the bit portion may be used.

In this method, signals detected during bit reproduction start time t=1 to time t=m (m>1) are re-arranged in the order of the magnitudes of strengths, and a signal value located at the middle position of this order, i.e., the median value is used as Ip(max).

With this processing, even when a large noise component unexpectedly mixes in signals detected during the period from t=1 to t=m, the influence on Ip(max) can be more reduced than that in the first method using the average value.

In the above examples, the subsequent binarization processing is performed without changing Ip(max) which is set before bit reproduction.

However, in an actual recording/reproducing apparatus, the signal strengths may often change due to a change in interval between the probe tip and the recording surface or attachment/detachment of foreign matter to the probe tip during bit reproduction.

Therefore, even during bit reproduction, it is preferable to periodically detect signals on the recording surface portion other than the bit portion and to repetitively re-set Ip(max).

With this processing, since Ip(n) can always be normalized using latest, optimal Ip(max), bit reproduction can be normally performed.

In the above description, binarization processing is performed by setting the ratio between Ip(n) and Ip(max) [see formula (1)] to be a new signal strength.

However, when Ip(max) is extremely smaller than Ip(n) depending on the signal state, the ratio may have an inaccurate value.

In view of this problem, in place of comparing formula (1) with the threshold value, A·Ip(max) [where A is a constant] is defined as a threshold value, and binarization processing of Ip(n) is performed using this threshold value, thereby detecting bits recorded on the recording surface.

Note that the constant A is a setting value corresponding to the threshold value used upon execution of the binarization processing of formula (1).

For example, if A=1, 3, 10, 30, and 100, binarization processing is substantially equivalent to that to be performed when the threshold value for formula (1) is set to be 1, 3, 10, 30, and 100. However, in this case, no division processing is required, and even when Ip(max) has a small value, probability of inaccurate processing can be eliminated.

On the other hand, when the signal strength of a signal that reflects the state of the recording surface detected by a probe upon bit reproduction on a bit portion is relatively smaller than that detected on a recording surface portion other than the bit portion, a new signal is formed by setting the ratio (given by formula (13) below) between a minimum signal strength Ip(min) of those that reflect the state of the recording surface detected by probe No. p during the period from time t=1 to time t=m, and a signal strength Ip(n) that reflects the state of the recording surface detected by probe No. p at arbitrary time t=n (n≧m) during bit reproduction to be a new signal strength at time t=n, i.e., by normalizing Ip(n) by Ip(min):

$$\cdot Ip(n)/Ip(\min) \qquad (13)$$

Then, the new signal is subjected to binarization processing by setting a threshold value in correspondence with the signal.

This is because the relative relationship between the signal strengths detected on the bit portion and a portion other than the bit portion by probe No. p is opposite to that in the above-mentioned case in which the signal processing according to the present invention has been described using formula (1).

In this case as well, when the probe scans a region other than the bit portion, the magnitude of Ip(n) does not become constant but fluctuates. However, Ip(n) never becomes smaller than a certain minimum value (larger than the signal strength on the bit portion).

The minimum value substantially equals Ip(min) unless the state of the recording signal before formation of bits has an extremely large difference.

The processing result according to formula (13) will be described below upon classification into some cases.

<Case 1> When the probe scans a region other than the bit portion after Ip(min) is determined:

In this case, $$Ip(n) \geq Ip(\min) \qquad (14)$$

Therefore, $$Jp(n) = Ip(n)/Ip(\min) \geq 1 \qquad (15)$$

<Case 2> When the probe scans the bit portion after Ip(min) is determined:

In this case, $$Ip(n) < Ip(\min) \qquad (16)$$

Therefore, $$Jp(n) = Ip(n)/Ip(\min) < 1 \qquad (17)$$

As can be seen from formulas (15) and (17), when the binarization processing is performed by setting the threshold value=1, only bits can be accurately detected.

On the other hand, the signal to be input to the signal processing means according to the present invention need only reflect the distribution, in the recording surface, of the magnitudes of interaction between the probe and the recording medium.

For example, as the interaction, a tunnel current, an interatomic force, a magnetic force, evanescent light, and the like are known. On the other hand, the recording medium is not particularly limited.

The embodiments of the present invention will be described below.

[Embodiment 1]

In this embodiment, bit detection was performed using a recording/reproducing apparatus comprising the signal processing means according to the present invention.

The arrangement of the recording/reproducing apparatus used in this embodiment will be described below with reference to FIGS. 3 and 4.

Figure 3:
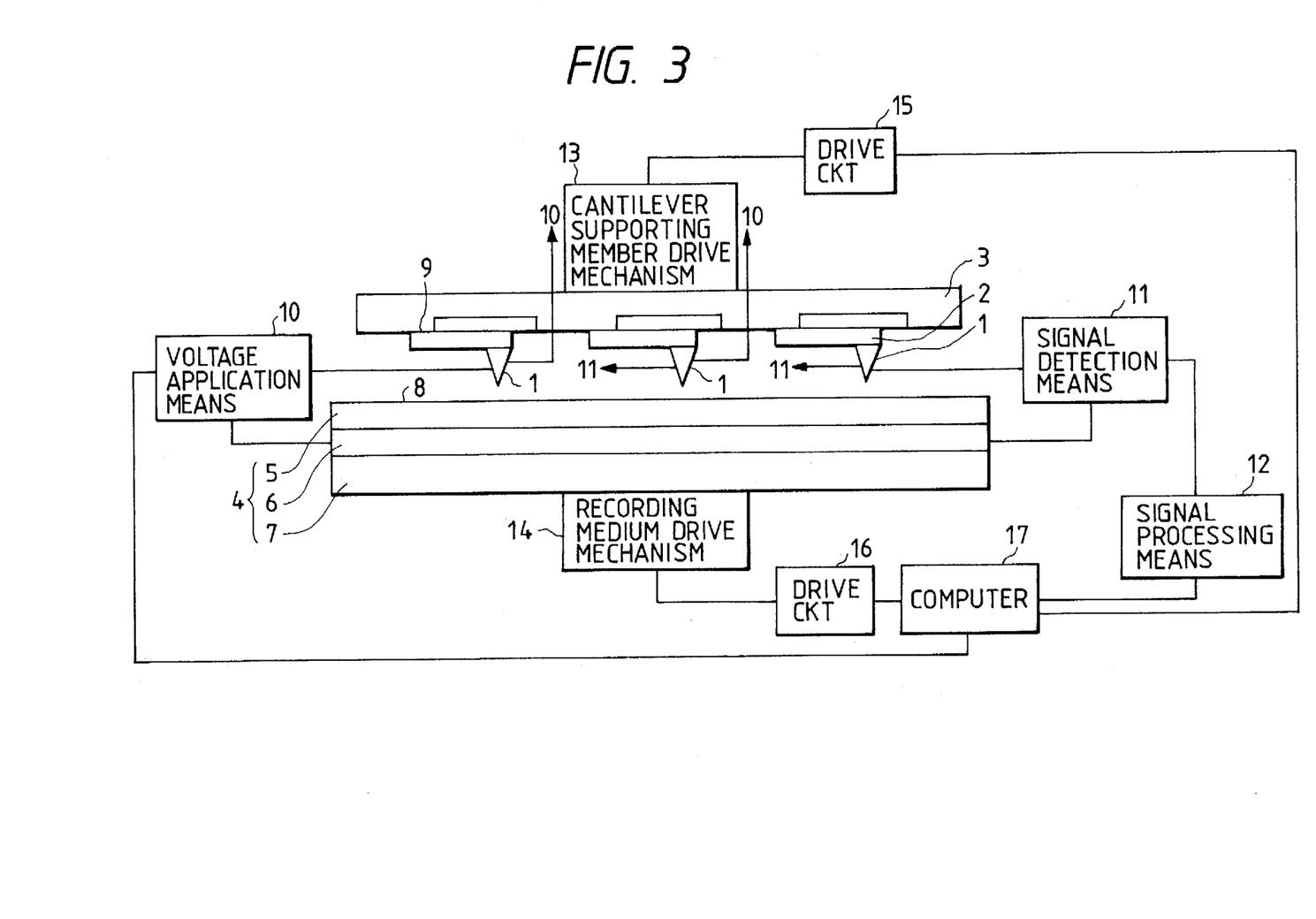
FIG. 3 is a schematic view of a recording/reproducing apparatus used in Embodiments 1 and 2.
Figure 4:
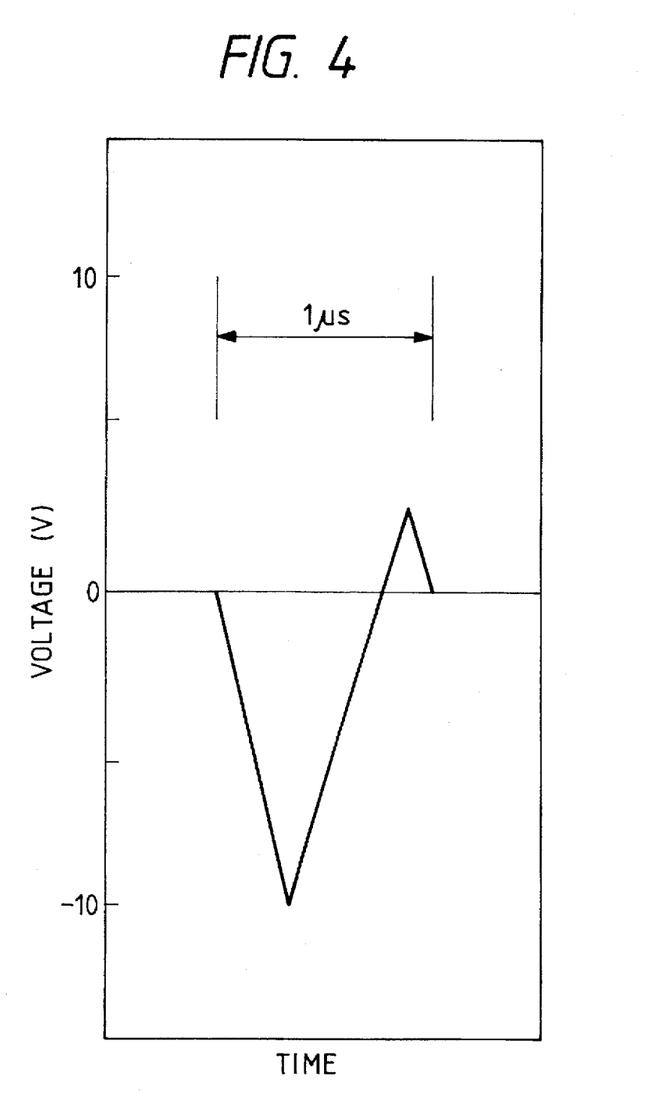
FIG. 4 is a graph showing the voltage application pattern for forming a bit.

Referring to FIG. 3, a probe 1 has conductivity. The recording/reproducing apparatus of this embodiment has 100 probes (FIG. 3 illustrates only three probes).

Each probe is fixed to the free end of a cantilever 2. The cantilevers 2 are two-dimensionally arranged on and fixed to a cantilever supporting member 3.

The probes 1, the cantilevers 2, and the cantilever supporting member 3 were manufactured using the known micro working technique called micro-mechanics, and the micro-electronics technique used upon manufacture of LSIs and the like (for example, see Petersen, Proc. IEEE, Vol. 70, p. 420 (1982), and Japanese Laid-Open Patent Application Nos. 62-281138 and 1-196751).

A recording medium 4 is constituted by a recording layer 5, an electrode 6, and a substrate 7.

In this embodiment, a quartz glass substrate was used as the substrate 7. The electrode 6 is a 1,000-Å thick Au layer formed on the substrate 7 by vacuum deposition.

The recording layer 5 was prepared as follows. That is, squalirium-bis-6-octylazulene (SOAZ) was used as the constituting material, and two SOAZ monomolecular film layers were stacked on the electrode 6 by an LB method (see Japanese Laid-Open Patent Application No. 63-161552).

A recording surface 8 of the recording layer 5 is arranged inside the recording apparatus to oppose the tips of the probes 1.

Fixed ends 9 of the cantilevers 2 are present in a plane parallel to the recording surface 8.

A voltage application means 10 applies a voltage across the probes and the electrode upon formation and reproduction of bits.

A signal detection means 11 converts the magnitude of the interaction between the probe and the recording medium detected by each probe upon bit reproduction into an electrical signal.

A signal processing means 12 according to the present invention is connected to the signal detection means 11.

A cantilever supporting member drive mechanism 13 drives the cantilever supporting member 3 with respect to the recording surface 8. A recording medium drive mechanism 14 drives the recording medium 4.

The drive mechanism 13 and 14 are respectively driven in accordance with signals from drive circuits 15 and 16. As will be described below, in recording and reproduction operations, the cantilever supporting member drive mechanism 13 and the recording medium drive mechanism 14 are driven to move the probes and the recording medium relative to each other.

A computer 17 controls the recording/reproducing apparatus. The computer 17 assigns Nos. 1 to 100 to the 100 probes arranged in the recording/reproducing apparatus of this embodiment to recognize and identify them.

The recording/reproducing operation on the recording layer 5 consisting of the SOAZ monomolecular multilayered film will be described below.

In this embodiment, bit formation (recording operation) on the recording layer 5 was performed by the following method.

The cantilever supporting member 3 and the recording surface 8 are brought close to each other, so that the plurality of probes 1 are set in the vicinity of the recording surface 8.

In this state, the probes and the recording surface are scanned relative to each other. At a desired position on the recording surface 8, the voltage application means 10 applies a voltage having a pattern shown in FIG. 4 across the corresponding probe 1 and the electrode 6 while the probe 1 is set at the + side, and the electrode 6 is set at the − side.

After voltage application, the conductivity of a very small region, opposing the probe 1, of the recording layer 5 increases, and this state is preserved.

Bits are formed by the above-mentioned method.

In this embodiment, in order to easily confirm that the signal processing of the present invention allows accurate bit detection, each probe was used to form five bits on the recording surface.

In this embodiment, the bits recorded on the recording medium were reproduced by the following method.

The probes and the recording surface are scanned relative to each other while the probes applied with a voltage of +1.5 V from the voltage application means 10 are set in the vicinity of the recording surface 8.

During scanning, the interval between the cantilever supporting member 3 and the recording surface 8 is held to be constant.

A very weak current flowing in each probe during scanning is measured by the signal detection means 11.

The signal measured by the signal detection means is input to the signal processing means 12 according to the present invention. The signal processing means 12 performs signal processing according to the present invention for the input signal, thus performing bit detection.

In this embodiment, a test in which each probe reproduced bits formed by itself was performed.

Figure 5A:
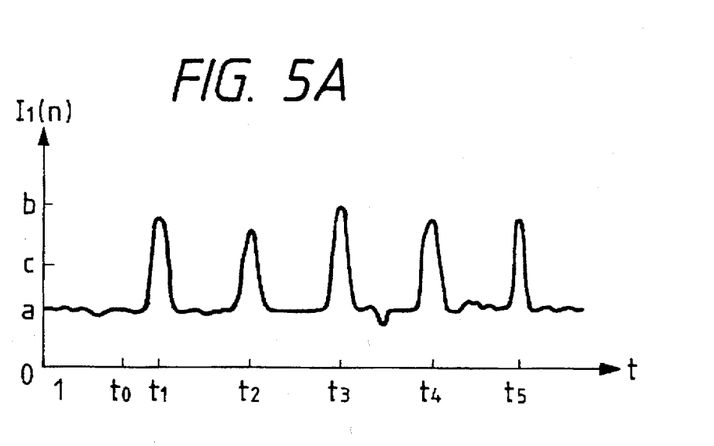
FIGS. 5A to 5C are graphs showing the signal processing steps in a signal processing means in Embodiment 1.

FIG. 5A shows the time-series pattern of a current flowing probe No. 1 (i.e., the output from the signal detection means 11) upon reproduction of a bit sequence formed on the recording surface 8 using probe No. 1. The abscissa (t) plots the time elapsed from the beginning of bit reproduction, and t=1 corresponds to bit reproduction operation start time. The ordinate (I(n)) plots the output signal from the signal detection means 11. The signal processing according to the present invention was performed for the signal shown in FIG. 5A.

A maximum signal $I_1(max)$ of those detected by probe No. 1 during the period from time t=1 to time $t=t_0$ is detected.

Figure 5B:
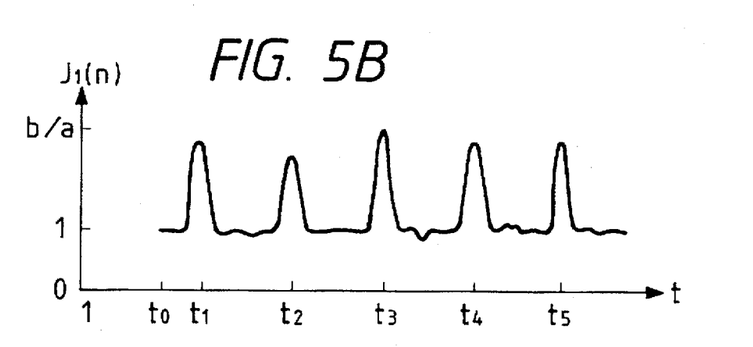
Figure 5C:
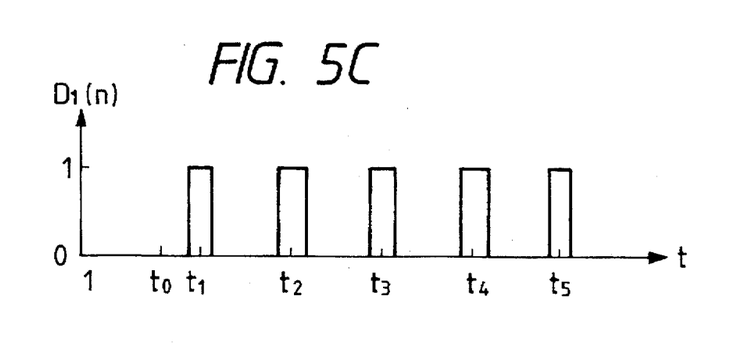

Subsequently, the signal processing given by formula (1) above was performed. FIG. 5B shows the processing result. Binarization processing was performed for the signal shown in FIG. 5B while setting the threshold value to be 1, thus obtaining a digital signal $D_1(n)$. FIG. 5C shows the processing result. As can be seen from FIG. 5C, probe No. 1 could accurately detect five bits formed by itself.

The signal processing according to the present invention was performed not only for the current flowing in probe No. 1 but also for those flowing in other probes, and bit reproduction was performed.

Figure 6A:
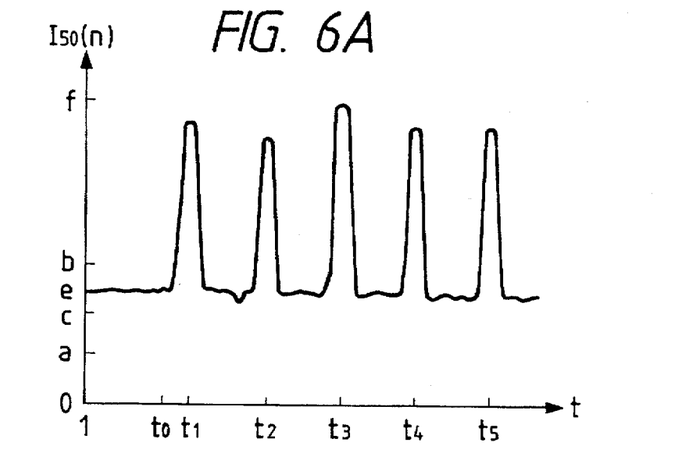
FIGS. 6A to 6D are graphs showing the signal processing steps in the signal processing means in Embodiment 1.

For example, FIG. 6A shows a time-series pattern of a current flowing in probe No. 50 (i.e., the output from the signal detection means 11) upon reproduction of a bit sequence formed on the recording surface 8 using probe No. 50. The abscissa (t) plots the time elapsed from the beginning of bit reproduction, and t=1 corresponds to bit reproduction operation start time. The ordinate ($I_{50}(n)$) plots the output signal from the signal detection means 11.

As is apparent from a comparison between FIGS. 6A and 5A, the interval between the tip of probe No. 50 and the recording surface was smaller than that of probe No. 1.

The signal processing according to the present invention was also performed for the signal shown in FIG. 6A.

Figure 6B:
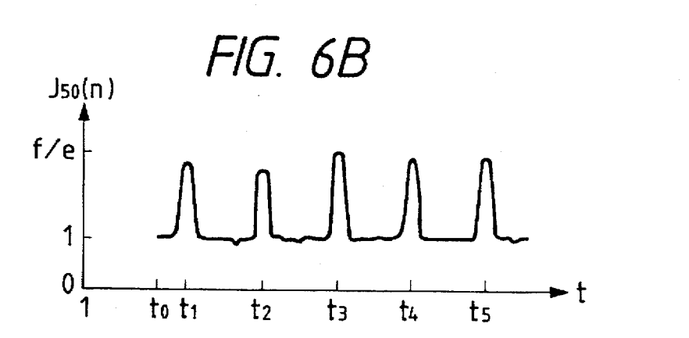
Figure 6C:
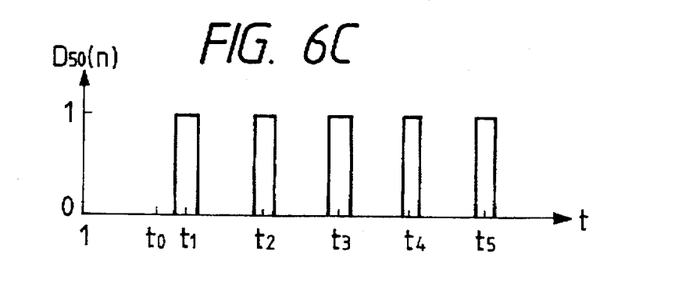

A maximum signal $I_{50}(max)$ of those detected by probe No. 50 during the period from time t=1 to time t=$t_0$ is detected. Subsequently, the signal processing given by formula (1) above was performed. FIG. 6B shows the processing result. Binarization processing was also performed for the signal shown in FIG. 6B while setting the threshold value to be 1, thus obtaining a digital signal $D_{50}(n)$. FIG. 6C shows the processing result. As can be seen from FIG. 6C, probe No. 50 could accurately detect five bits formed by itself.

As a result of bit detection performed by similar signal processing for signals obtained by other probes, accurate bit detection could be attained by setting the threshold vale to be 1.

As described above, when bit reproduction is performed using a plurality of probes having different intervals between the probe tips and the recording surface, although the respective probes detect different signal strengths, the signal processing of the present invention can avoid occurrence of bit recognition errors and unrecognized bits.

(Comparative Example 1)

During the reproduction operation in Embodiment 1, the output from the signal detection means 11 was divided into two outputs, and one output was input to the signal processing means 12 (its processing result have been described in Embodiment 1).

The other output was directly subjected to binarization processing without any signal processing of the present invention.

Binarization processing was performed for the signal shown in FIG. 5A while the threshold value was set to be c shown in FIG. 5A with respect to the current that flowed in probe No. 1. The processing result was the same as that shown in FIG. 5C.

Figure 6D:
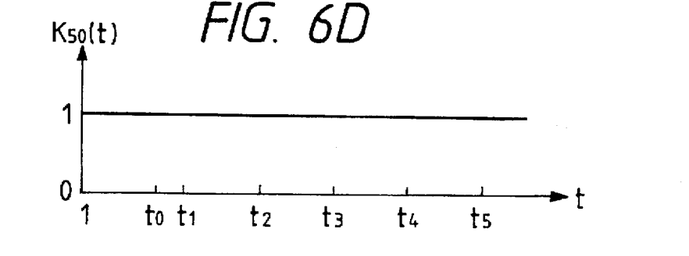

Also, binarization processing was performed for the signal shown in FIG. 6A while the threshold value was set to be c with respect to the current that flowed in probe No. 50. The processing result was as shown in FIG. 6D, and regions other than bits were erroneously recognized as bits.

[Embodiment 2]

In this embodiment, the same recording/reproducing apparatus as in Embodiment 1 was used.

The same bits as in Embodiment 1 were reproduced using the same signal processing as in Embodiment 1 in an environment at room temperature higher than that at which the reproduction operation of Embodiment 1 was performed.

Since the room temperature in the reproduction operation is different, the interval between each probe tip and the recording surface is different from that in Embodiment 1.

However, as a result of bit reproduction, it was confirmed that occurrence of bit recognition errors and unrecognized bits could be avoided.

With the above arrangement according to the present invention, in a recording/reproducing apparatus using a plurality of probes, even when probes have different intervals between their probe tips and the recording surface, or even when these intervals change due to a change in use environment of the apparatus, a recording/reproducing apparatus and method, which can attain accurate bit recognition without performing any complex threshold value control and interval control and without changing the threshold value in binarization processing, and can reduce the apparatus scale and consumption power, can be realized.

What is claimed is:

1. A recording/reproducing apparatus in which a recording surface of a recording medium on which a recording bit is formed is scanned using a probe and the recording bit is detected by comparing a signal detected via the probe with a predetermined threshold value, including:

signal processing means for normalizing a signal detected within the recording surface, on the basis of an amplitude value of a signal detected, by the probe, on a portion where no recording bit is present.

2. An apparatus according to claim 1, wherein when an amplitude value of a signal detected on a portion where the recording bit is present is larger than the amplitude values of the signals detected on the portion where no recording bit is present, said signal processing means normalizes the signal detected within the recording surface with a maximum value of the amplitude values of the signals detected on the portion where no recording bit is present.

3. An apparatus according to claim 1, wherein when an amplitude value of a signal detected on a portion where the recording bit is present is smaller than the amplitude values of the signals detected on the portion where no recording bit is present, said signal processing means normalizes the signal detected within the recording surface with a minimum value of the amplitude values of the signals detected on the portion where no recording bit is present.

4. An apparatus according to claim 1, wherein said signal processing means normalizes the signal detected within the recording surface with an average value of the amplitude values of the signals detected on the portion where no recording bit is present.

5. An apparatus according to claim 1, wherein said signal processing means normalizes the signal detected within the recording surface with the median value of the amplitude values of the signals detected on the portion where no recording bit is present.

6. An apparatus according to claim 1, wherein the amplitude value used for normalizing the signal detected within the recording surface is detected a plurality of number of times.

7. An apparatus according to claim 1, wherein said signal processing means detects the signal by utilizing a tunnel current.

8. An apparatus according to claim 1, wherein said signal processing means detects the signal by utilizing an electrostatic force.

9. An apparatus according to claim 1, wherein said signal processing means detects the signal by utilizing an interatomic force.

10. An apparatus according to claim 1, wherein said signal processing means detects the signal by utilizing a magnetic force.

11. An apparatus according to claim 1, wherein said signal processing means detects the signal by utilizing evanescent light.

12. A recording/reproducing method in which a recording surface of a recording medium on which a recording bit is formed is scanned using a probe and the recording bit is detected by comparing a signal detected via the probe with a predetermined threshold value, comprising the steps of:

detecting a signal using the probe at a portion where no recording bit is present;

normalizing a signal detected within the recording surface on the basis of an amplitude value of the detected signal; and detecting the recording bit by comparing the normalized signal with the threshold value.

* * * * *

UNITED STATES PATENT AND TRADEMARK OFFICE
CERTIFICATE OF CORRECTION

PATENT NO. : 5,751,684
DATED : May 12, 1998
INVENTOR(S) : TOSHIHIKO TAKEDA, ET AL.

Page 1 of 2

It is certified that error appears in the above-identified patent and that said Letters Patent is hereby corrected as shown below:

On the title page, item

AT [56] REFERENCES CITED

U.S. PATENT DOCUMENTS

"5,348,735  9/1994  Kawase et al." should read
--5,349,735  9/1994  Kawase et al--.

AT [57] ABSTRACT

Line 6, "basis" should read --basis of--.

COLUMN 3

Line 25, "of;" should read --of:--.

COLUMN 4

Line 12, "($n \leq m$)" should read --($n \geq m$)--.

COLUMN 5

Line 14, "determined" should read --determined:--;
Line 22, "determined" should read --determined:--;
Line 42, "detectedby" should read --detected by--; and
Line 57, "determined" should read --determined:--.

UNITED STATES PATENT AND TRADEMARK OFFICE
CERTIFICATE OF CORRECTION

PATENT NO. : 5,751,684

DATED : May 12, 1998

INVENTOR(S) : TOSHIHIKO TAKEDA, ET AL.

It is certified that error appears in the above-identified patent and that said Letters Patent is hereby corrected as shown below:

<u>COLUMN 11</u>

Line 30, "vale" should read --value--.

Signed and Sealed this

Eighth Day of December, 1998

*Attest:*

BRUCE LEHMAN

*Attesting Officer*      *Commissioner of Patents and Trademarks*